SWITCHING NETWORK COMPRISING TECNETRONS

Filed Nov. 9, 1964 3 Sheets-Sheet 1

INVENTOR
MICHEL M. ROUZIER
BY
Abraham A. Saffitz
ATTORNEY

SWITCHING NETWORK COMPRISING TECNETRONS

Filed Nov. 9, 1964

INVENTOR
MICHEL M. ROUZIER
BY
Abraham A. Saffitz
ATTORNEY

SWITCHING NETWORK COMPRISING TECNETRONS

Filed Nov. 9, 1964 3 Sheets-Sheet 3

INVENTOR
MICHEL M. ROUZIER
BY Abraham A. Saffitz
ATTORNEY

United States Patent Office 3,392,373
Patented July 9, 1968

1 2

3,392,373
SWITCHING NETWORK COMPRISING TECNETRONS
Michel M. Rouzier, 15 Chemin de la Sabliere, Vauhallan, France
Filed Nov. 9, 1964, Ser. No. 409,716
Claims priority, application France, Nov. 13, 1963, 953,644
3 Claims. (Cl. 340—166)

ABSTRACT OF THE DISCLOSURE

The invention relates to a multi-stage telephone switching network, each stage of which comprises a plurality of matrices having homologous rows, columns and crosspoints for interconnecting subscriber lines individually connected to a row of the first stage matrices and to a column of the last stage matrices, and auxiliary control columns. The crosspoints are bistable switching tecnetrons having their cathode, gate and anode respectively connected to said columns, rows and auxiliary columns. They are used as a diode between cathode and gate and have a cathode to gate voltage change-over point which has a variable amplitude as a function of the anode voltage. The homologous auxiliary columns of all the matrices of any given stage are connected in series and each column of the matrices of all the stages but the last is connected to a row of a matrix of the following stage whereby the connection between a first and a second subscriber line respectively connected to a row of the first stage and to a column of the last stage is made by applying simultaneous pulses to a given auxiliary column in each stage for lowering the change-over voltage of the associated crosspoints and to the row of the first stage connected to said first subscriber line for controlling the change over of one crosspoint in each stage successively.

The present invention relates to a control device for electronic switching networks having a spatial organization and comprising connection matrices, the intersection points of which consist of switching tecnetrons.

It is known from the copending U.S. application Ser. No. 137,357, filed Sept. 11, 1961, by Stanislas Teszner, now U.S. Patent No. 3,176,203, issued Mar. 30, 1965, that a switching tecnetron is a centripetal field-effect semiconductor device consisting of a rod, for example of N type germanium, substantially cylindrical in shape and comprising a source electrode or cathode, a drain electrode or anode, a central groove of increasing cross-section from the end adjacent to the cathode to the end adjacent to the anode, a gate electrode of frustoconical cross-section in the central groove and shorter than this, and a small additional groove hollowed out of the central groove in the immediate vicinity of the gate electrode at the cathode side. These tecnetrons used as a diode between cathode and gate have a current-voltage characteristic of which one region has a negative slope and the change-over voltage of which may vary within relatively wide limits as a function of the anode voltage. Within these limits, the change-over voltage of a given tecnetron is substantially equal to the product of its anode voltage by a constant coefficient $\alpha$ less than or equal to unity.

The variation in the change-over voltage of such tecnetrons and more generally their gate-current/gate-voltage characteristics for various values of their anode voltage are similar to the variations in the change-over voltage and to the current-voltage characteristics of a double-base diode as a function of the potential difference between bases.

The general object of the present invention is to provide control devices for switching networks in which the crosspoints have current-voltage characteristics as defined above.

A particular object of the present invention is to provide control devices for switching networks wherein the crosspoints are switching tecnetrons having the characteristics obtained by applying the process described in the U.S. patent referred to above.

One feature of the control devices of the invention is that when said tecnetrons are used as a diode between the cathode and the gate, their anode is used as a control electrode to lower their change-over voltage and their gate electrode is used as a change-over control electrode.

A further feature of the control devices of the invention is to permit the use of switching tecnetrons having a change-over voltage associated with their anode voltage by a coefficient $\alpha$ which may be comprised between 0.7 and unity.

The invention is described in detail below with reference to the accompanying drawings.

Figure 1:
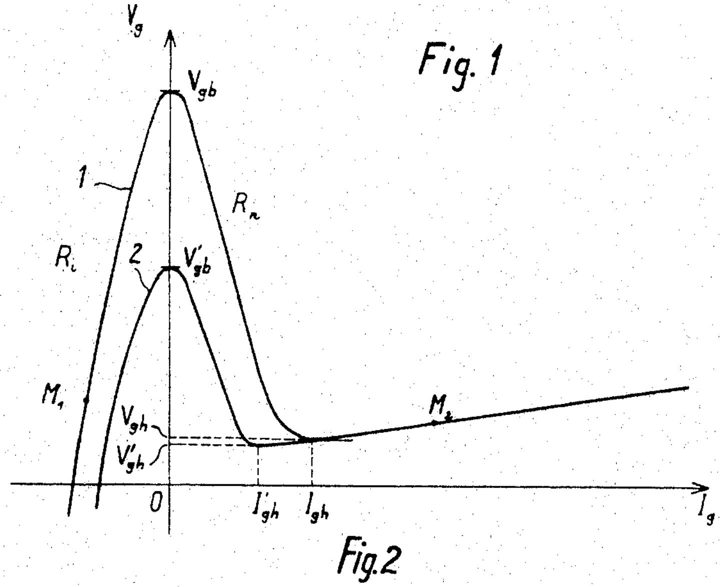
FIGURE 1 shows the current-voltage characteristics between the cathode and gate of a switching tecnetron for two different values of its anode voltage.

The curve 1 in FIGURE 1 is a characteristic curve of the gate voltage $V_g$ of a switching tecnetron as a function of its gate current $I_g$ for a given anode voltage $V_a$. As is known, with a negative gate current it has a branch with a steep positive slope corresponding to a high positive impedance $R_i$, with a gate current substantially zero it has a maximum known as the change-over voltage having a value $V_{gb}=\alpha V_a$, and for positive values of the gate current it has a branch with a strong negative impedance $R_n$ followed by a branch having a weak positive impedance $R_\alpha$ after a minimum $V_{gh}$ known as the voltage of the valley point for a gate current $I_{gh}$. The curve 2 is a curve similar to curve 1 but corresponding to an anode voltage $V'_a<V_a$. It has a maximum $$V'_{gb}=\alpha V'_a<V_{gb}$$

a voltage of the valley point $V'_{gh}$ slightly lower than $V_{gh}$ for a value of the gate current $I'_{gh}$ distinctly lower than $I_{gh}$ and a branch having a weak positive impedance $R_\alpha$ substantially coinciding for the greater part with the corresponding branch of the curve 1.

Figure 2:
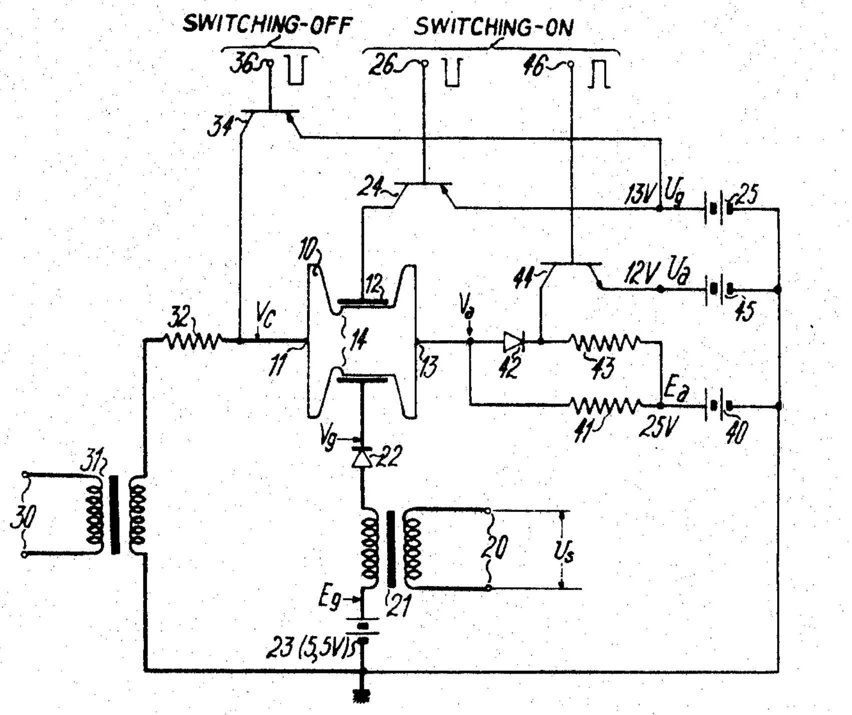
FIGURE 2 shows a switching tecnetron mounted at a crosspoint in a switching network according to the invention.

FIGURE 2 shows a switching tecnetron 10 mounted according to the invention, to establish or interrupt the connection between two sections 20 and 30 of telephone lines. The tecnetron 10 consists of a semiconductor body, for example of N type, comprising a cathode 11, an anode 13 and a central groove provided with an annular gate electrode 12. Between the gate electrode 12 and the cathode 11, a small groove 14, which is characteristic of switching tecnetrons, is hollowed out of the central groove in such a manner as to constitute a cathode resistance having a variable value which is sufficiently high before the change-over and becomes very low after changing over.

The two sections of telephone line 20 and 30 end respectively at the primary windings of transformers 21 and 31. The secondary winding of the transformer 21 is connected on the one hand to the gate electrode 12 by means of a diode 22 and on the other hand to a bias source 23 of a voltage $E_g$ and the negative pole of which is connected to earth.

The secondary winding of the transformer 31 is connected on the one hand to the cathode 11 through an active network 32 represented by a resistor by way of simplification, and on the other hand to earth. The network 32 is a known circuit comprising two transistors, the purpose of which is to limit the sum of the signals which may arrive over the two telephone lines 20 and 30 to a maximum peak voltage $U_s$.

The cathode 11 is connected to the collector of a p-n-p transistor 36, the emitter of which is connected to the positive pole of a source 25 of voltage $U_g$ higher than voltage $E_g$ of the source 23, and the negative pole of which is connected to earth. The negative disconnection pulses applied to the base 36 of the transistor 34 have the effect of unblocking it to saturation and consequently of bringing the cathode 11 of the tecnetron 10 to the potential $U_g$.

The gate electrode 12 is connected to the collector of a p-n-p transistor 24, the emitter of which is connected to the positive pole of the source 25. The anode 13 of the tecnetron 10 is connected in parallel with the anode of a diode 42 and by means of a resistor 41 of value $R_1$ to the positive pole of a source 40 of voltage $E_a$, the negative pole of which is connected to earth. The cathode of the diode 42 is connected in parallel with the positive pole of the source 40 by means of a resistor 43 and with the collector of an n-p-n transistor 44, the emitter of which is connected to the positive terminal of a source 45 of voltage $U_a$ which is lower than the voltage $E_a$ of the source 40. In order to cause the tecnetron 10 to change over into the connection state, two unblocking pulses, which are respectively negative and positive, are applied simultaneously to the bases 26 and 46 of the transistors 24 and 44 and have the effect of bringing the gate electrode 12 to the potential $U_g$ of the source 25, and the anode 13 to the potential $U_a$ of the source 45. When the tecnetron 10 is in the disconnection state, it is traversed by a weak anode current $I_a$ of the order of a milliampere which fixes the potential of its anode 13 at the value $V_a=E_a-R_1I_a$, that is to say its anode voltage in relation to the potential $V_c$ of its cathode at a value $V_a-V_c$ and consequently its change-over voltage at the value $V_{gb}=V_c-\alpha(V_a-V_c)$, its working point $M_1$ thus being situated on the branch of the curve 1 having a strong positive impedance $R_i$.

In order that the stability of the tecnetron 10 may be ensured in this state, even in the presence of low-frequency signals of maximum peak voltage $U_s$ which may arrive, for example, from the telephone line 20, the electromotive force $E_g$ of the bias source 23 for the gate electrode 12 is selected in such a manner that the gate potential $$V_g=E_g+U_s$$

is lower than the change-over potential of the tecnetron for the lowest permissible value of $\alpha$, that is to say:

$$E_g+U_s<\alpha_{min}(E_a-R_1I_a) \quad (1)$$

When a positive unblocking pulse is applied to the n-p-n transistor 44, the anode potential of the tecnetron 10 drops to the value $U_a<E_a$ and in consequence its current-voltage characteristic becomes similar to the curve 2 in FIGURE 1 with a change-over voltage $$V'_{gb}=V_c-\alpha(U_a-V_c)$$

Since the optimum value of $\alpha$ is unity, it is therefore sufficient, in order to cause the tecnetron 10 to change over, for the potential $U_g$ applied to its gate electrode, through unblocking of the transistor 24 and of the transistor 44 simultaneously to be greater than $U_a$:

$$U_g>U_a \quad (2)$$

The working point $M_2$ of the transistor 10 is then on the low resistance branch $R\alpha$ of the curve 2 and the direct current which flows from the positive terminal of the source 23 to earth, passing through the secondary winding of the transformer 21, the diode 22, the tecnetron 10 between the anode electrode 12 and the cathode 11, the network 32 and the secondary winding of the transformer 31, is modulated by the conversation signals originating from the telephone lines 20 and 30. The potential difference $v$ which develops between the cathode 11 and the gate electrode 12 for a given gate current $I_g$ is not strictly the same for all the tecnetrons and permissible limits are such that this potential difference is less than a limiting value $v_{max}$ in the sphere of use, that is to say in practice for gate currents comprised between 5 and 20 milliamperes. In order that the connection thus made may be maintained, particularly when the voice-frequency signals originating from one or the other of the lines 20 and 30 or from both together reach the peak voltage $U_s$, it is necessary for the bias voltage $E_g$ applied to the gate electrode to be higher than the sum of the voltage drop in the tecnetron and the peak voltage $U_s$ $$E_g>v_{max}+U_s \quad (3)$$

When the tecnetron 10 is in the connection state, the unblocking of the transistor 34 by a disconnection pulse applied to its base 36 brings its cathode to the same potential as its gate electrode, the interruption of the current $I_g$ which results causes the reverse change-over and the working point of the tecnetron 10 returns to $M_1$ on the high-impedance branch of the curve 1.

In order that one only of the two connection control pulses may not be sufficient to cause the tecnetron 10 to change over, it is necessary on the one hand for the voltage $U_a$ applied to its anode through the transistor 44 to be insufficient to lower the changeover voltage of a tecnetron having the permissible coefficient $\alpha_{min}$ below the maximum voltage $E_g+U_s$ which may be applied to its gate electrode, which leads to the condition $$E_g+U_s<\alpha_{min}U_a \quad (4)$$

and on the other hand, with the same coefficient $\alpha_{min}$, for the voltage $U_g$ applied to its gate electrode by the transistor 24 to be lower than its change-over voltage $V_{gb}$ that is to say $$U_g<\alpha_{min}(E_a-R_1I_a) \quad (5)$$

The inequalities (1) to (5) given above express the conditions which are necessary and sufficient to ensure that a switching tecnetron such as 10 controlled by marking voltages applied to the anode and to the gate electrode may be able to work under the conditions required for a crosspoint in a switching matrix. From these inequalities there are deduced on the one hand:

$$v_{max}+2U_s<\alpha_{min}U_a$$

and $$U_a<\alpha_{min}(E_a-R_1I_a)$$

hence $$v_{max}+2U_s<\alpha^2_{min}(E_a-R_1I_a)$$

which relationship enables the minimum value of the electromotive force of the anode bias source 40 to be determined $$E_a>R_1I_a+\frac{v_{max.}+2U_s}{\alpha^2_{min.}}$$

and on the other hand:

$$\frac{1}{\alpha_{min.}}(v_{max.}+2U_s)<U_a<U_g<\alpha_{min.}(E_a-R_1I_a)$$

enabling the voltage $U_a$ of the source 45 and $U_g$ of the source 25 to be determined and finally $$v_{max}+U_s<E_g<\alpha_{min}U_a-U_s$$

giving the limiting values of the voltage of the course 23.

For example, if $R_1$=5000 ohms
$I_a$=1 milliampere
$\alpha_{min}$=0.7
$v_{max}$=2.3 volts
$U_s$=2.5 volts it will be found that $E_a > 19^v6$; if the value of $E_a$ is fixed at $25^v$ for example then $$10.4 < U_a < U_g < 14^v$$

is obtained which enables $U_a = 12^v$, $U_g = 13^v$ to be taken and $$4.8 < E_g < 6$$

which enables $E_g$ to be fixed at 5.5 volts.

Figure 3:
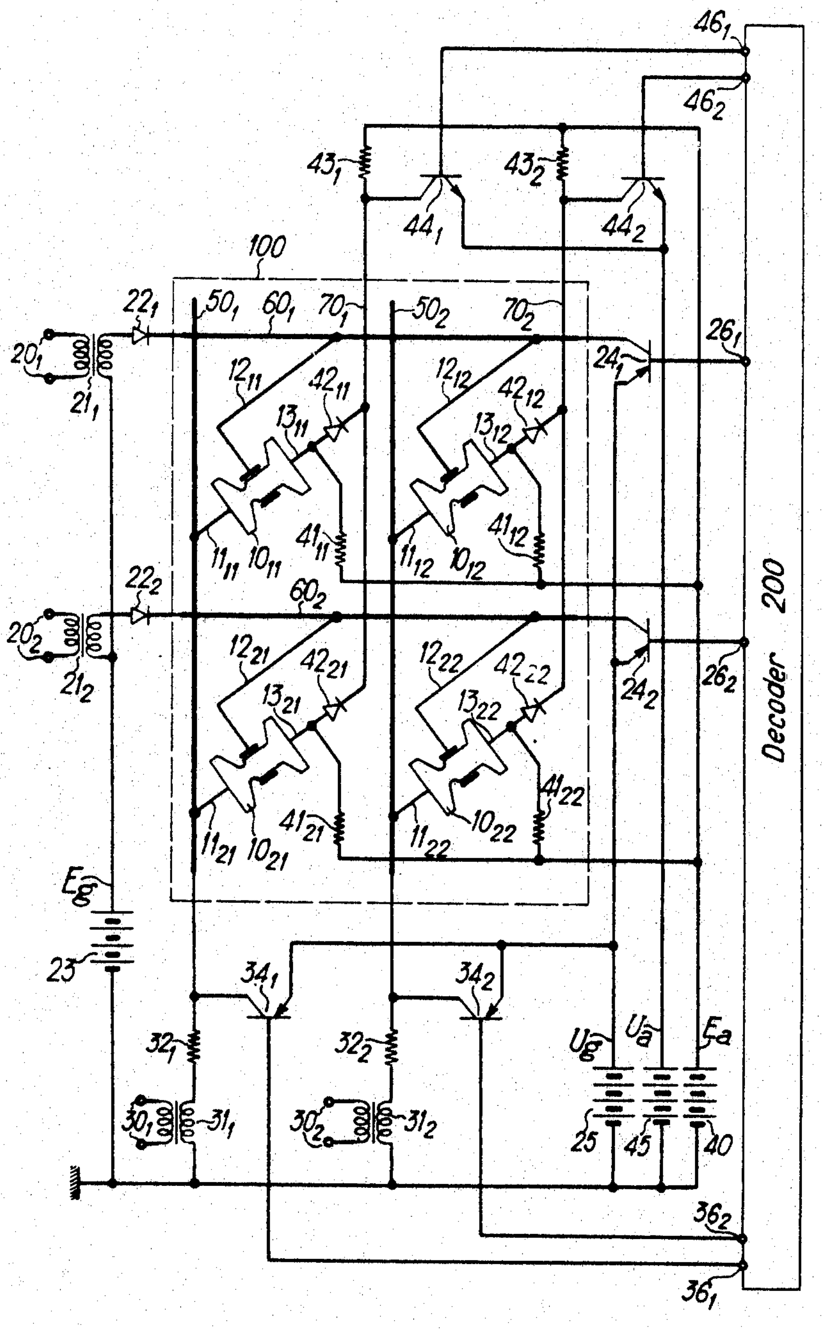
FIGURE 3 illustrates diagrammatically a switching matrix with crosspoints in accordance with FIGURE 2.

FIGURE 3 illustrates by way of example a switching matrix 100 comprising only two rows $\mathbf{60}_1$, $\mathbf{60}_2$ and two columns $\mathbf{50}_1$, $\mathbf{50}_2$ at the crosspoints of which are arranged tecnetrons $\mathbf{10}_{11}$, $\mathbf{10}_{12}$, $\mathbf{10}_{21}$, $\mathbf{10}_{22}$ connected as indicated in FIGURE 2 and the anode marking of which is effected by means of auxiliary columns $\mathbf{70}_1$, $\mathbf{70}_2$. The various members in FIGURE 2 are designated in FIGURE 3 by the same reference numerals with an index indicating their position in the matrix 100 when they recur several times. For example, in order to establish a connection between the telephone lines $\mathbf{20}_1$ and $\mathbf{30}_1$ which are respectively associated with the row $\mathbf{60}_1$ and the column $\mathbf{50}_1$, the transistors $\mathbf{24}_1$ and $\mathbf{44}_1$ are unblocked simultaneously by pulses leaving a decoder 200 according to the addresses of the row 1 and column 1 which are supplied to it by an address register not illustrated. The tecnetron $\mathbf{10}_{11}$, which has its anode $\mathbf{13}_{11}$ brought to the potential $U_a$ of the source 45 and simultaneously has its gate electrode brought to the potential $U_g$ of the source 25, changes over and is traversed by the direct current from the source 23 modulated by the speech signals from the lines $\mathbf{20}_1$ and $\mathbf{30}_1$. The tecnetrons $\mathbf{10}_{12}$ and $\mathbf{10}_{21}$, each of which only receives one of the connection signals, do not change over. For the disconnection, the decoder 200 unblocks the transistor $\mathbf{34}_1$ according to the column address received from the address register.

Figure 4:
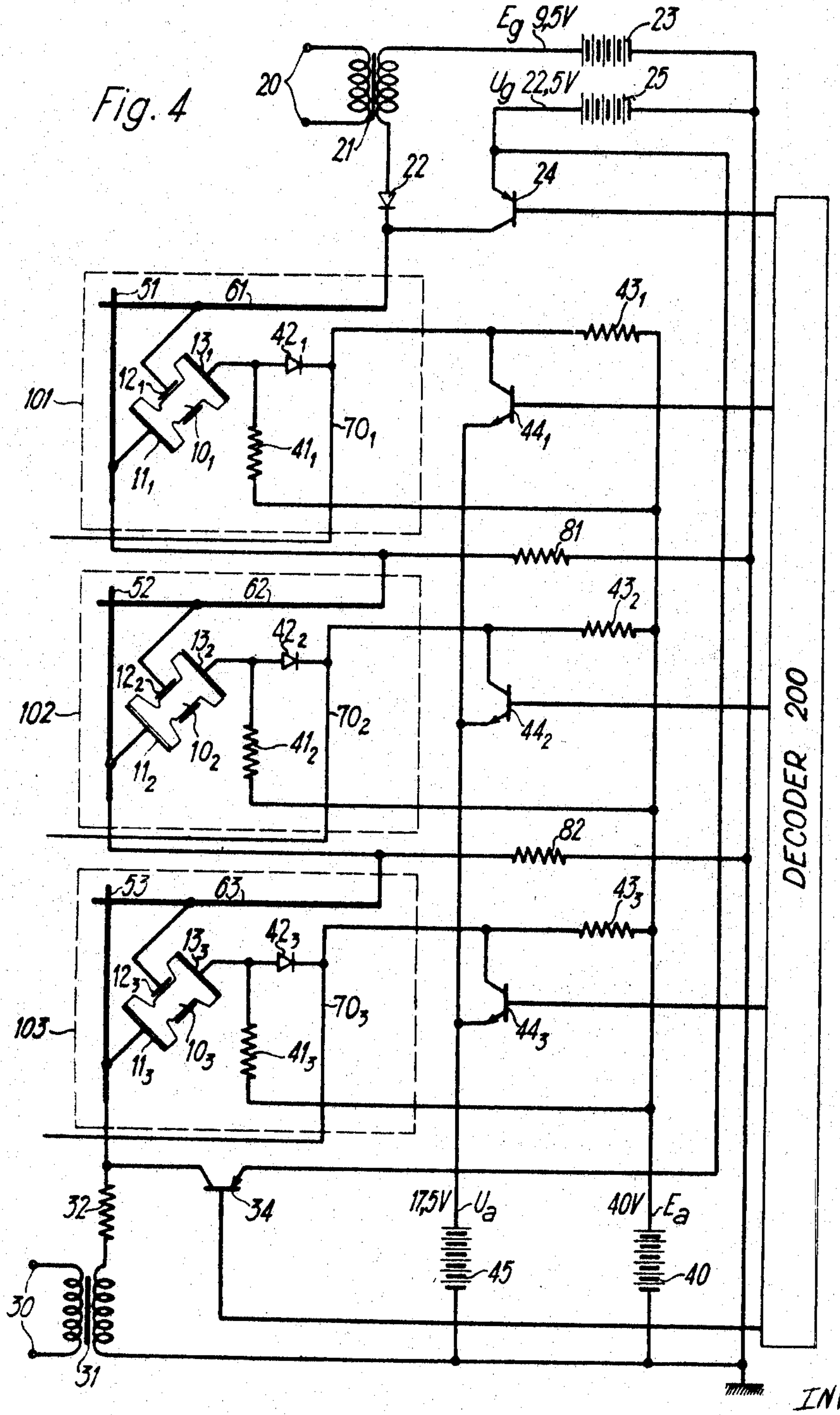
FIGURE 4 is a partial detailed illustration of a three-stage switching network according to the invention.

FIGURE 4 is a partial illustration of a three-stage switching network of tecnetron matrices associated in such a manner as to reduce the number of connection points, for an equal capacity, in comparison with a switching network with only one matrix. In each stage, only one matrix 101, 102, 103 is illustrated respectively, and in each of them only one row, 61, 62, 63 respectively, only one column, 51, 52, 53 respectively, and only one crosspoint, namely the tecnetrons $\mathbf{10}_1$, $\mathbf{10}_2$, $\mathbf{10}_3$, each of which has its gate electrode connected to the row 61, 62 or 63 respectively and its cathode connected to the column 51, 52 or 53 respectively. Each column such as 51 of the matrix 101 is connected to a row as 62 of the matrix 102 and, by means of a resistor 81, to earth. Similarly, each column such as 52 in the matrix 102 is connected to a row such as 63 in the matrix 103 and by means of a resistor 82 to earth. The purpose of the resistors 81 and 82 is to close the anode circuit of the tecnetrons $\mathbf{10}_1$, $\mathbf{10}_2$, the anode circuit of the tecnetron $\mathbf{10}_3$ being closed through the network 32 in series with the secondary winding of the transformer 31 as indicated with respect to FIGURE 2.

Since the application of a gate marking potential to a tecnetron in the connection state cannot be effected without a variation in its gate current resulting, as can be seen from FIGURE 1, a transistor such as 24 is allocated to each row of each matrix such as 101 in the first stage of matrices. On the other hand, since the low impedance branches of the characteristic curves 1 and 2 on which the figurative point $M_2$ is located coincide, the application of an anode marking potential to a tecnetron in the connection state does not cause any variation in its gate current. This peculiarity is turned to advantage to allocate a single anode marking transistor such as $\mathbf{44}_1$, $\mathbf{44}_2$, $\mathbf{44}_3$ and a single auxiliary column such as $\mathbf{70}_1$, $\mathbf{70}_2$, $\mathbf{70}_3$ to the columns having the same number in all the matrices of a given stage.

The connection of the lines 20 and 30 is effected by saturating simultaneously through decoder 200 the transistors $\mathbf{44}_1$, $\mathbf{44}_2$, $\mathbf{44}_3$ which apply the anode marking voltage $U_a$ to the three tecnetrons $\mathbf{10}_1$, $\mathbf{10}_2$, $\mathbf{10}_3$ and the transistor 24 which causes them to change over in succession, the gate marking voltage $U_g$ being propagated through the low resistance between gate and cathode of the tecnetron $\mathbf{10}_1$ in the connection state to the gate electrode of the tecnetron $\mathbf{10}_2$ and from the cathode of this to the gate electrode of the tecnetron $\mathbf{10}_3$.

The disconnection of the lines 20 and 30 is effected by saturating the transistor 34 which has the effect of blocking the tecnetrons $\mathbf{10}_3$, $\mathbf{10}_2$ and $\mathbf{10}_1$ in cascade.

The conditions which the voltages applied to the electrodes of the tecnetrons $\mathbf{10}_1$, $\mathbf{10}_2$, $\mathbf{10}_3$ have to satisfy are defined for each of them by the inequalities (1) to (5) drawn up with respect to FIGURE 2, each of which inequalities has to be satisfied for the least favoured tecnetron.

With regard to the condition of stability of the tecnetrons in the blocked state, which is expressed by the inequality (1) on the one hand and the conditions of not changing over under the action of only one of the marking pulses expressed by the inequalities (4) and (5) on the other hand, the tecnetron $\mathbf{10}_1$, to which the gate biassing voltage $E_g$ and gate marking voltage $U_g$ are applied directly, is the least favoured. These three inequalities therefore apply without any modification. With regard to the conditions of change-over and stability of the connection state respectively expressed by the inequalities (2) and (3), the tecnetron $\mathbf{10}_3$, which the voltages $U_g$ and $E_g$ only reach with a voltage drop which may be equal to $v_{max}$ in each of the tecnetrons $\mathbf{10}_1$ and $\mathbf{10}_2$, is the least favoured. The two inequalities (2) and (3) should therefore be replaced by the inequalities $$U_g - 2v_{max} > U_a \qquad (2')$$

and $$E_g - 2v_{max} > v_{max} + U_s$$

namely $$E_g > 3v_{max} + U_s \qquad (3')$$

which, for the values indicated in connection with FIGURE 2 gives $$E_g > 9.4 \text{ volts}$$
$$U_a > 17 \text{ volts}$$
$$U_g > 21.6 \text{ volts}$$
$$E_a > 35.8 \text{ volts}$$
$$E_g < 11.9 \text{ volts}$$

Hence, taking $E_a = 40$ volts for example, $U_g < 24.5$ volts which enables values such as:

$$U_a = 17.5 \text{ volts}$$
$$U_g = 22.5 \text{ volts}$$
$$E_g = 9.5 \text{ volts}$$

to be selected.

What I claim is:

1. A telephone switching matrix comprising rows, main and auxiliary associated columns, a first group of subscriber lines individually connected to said rows, a second group of subscriber lines individually connected to said main columns and crosspoints between said rows and columns for selectively interconnecting a subscriber line of said first group and a subscriber line of said second group, said crosspoints being constituted by switching tecnetrons each having a gate electrode connected to one of said rows, a cathode connected to one of said main columns and an anode connected to the associated auxiliary column, said tecnetrons being used as diodes between their cathode and gate electrode and having a voltage-current characteristic showing a negative slope region and a voltage change-over point which has an amplitude variable as a function of the voltage applied to their anode, means for applying simultaneous connection control pulses to a given auxiliary column to lower the change-over voltage of the tecnetrons connected to the associated main column and to a given row to switch from the blocked state to the passing state the tecnetron constituting the crosspoint between said given row and said associated main column, and means for applying a disconnection pulse to said associated main column to cause the last said tecnetron to switch from the passing to the blocked state.

2. A telephone switching matrix as claimed in claim 1 wherein the tecnetrons have a change-over voltage proportional to the anode voltage with a coefficient $\alpha$ which may be comprised between 0.7 and unity and wherein the gate voltage $E_g$, the anode voltage $V_a$, the amplitude $U_g$ of both the connection pulses applied to the gate electrode and the disconnection pulses applied to the anode are interrelated by the inequalities $$\frac{1}{0.7}(E_g+U_s)<U_a<U_g<0.7V_a$$

in which $U_s$ designates the peak amplitude of the A.C. signal to be connected between a row and a main column.

3. A switching network for telephone exchange including a given number of stages each comprising a plurality of matrices having homologous rows, main and auxiliary associated columns and crosspoints between said rows and columns for interconnecting subscriber lines individually connected to a row of a first stage matrix and to a main column of a last stage matrix, each main column of the matrices of all stages but the last being connected to a row of a matrix of the following stage, the homologous auxiliary columns of all the matrices in any given stage being connected in series, said crosspoints being constituted by switching tecnetrons having their cathode, gate and anode respectively connected to said main columns, rows and auxiliary columns, and being accordingly used as a bistable diode between anode and gate having a voltage change-over point of variable amplitude as a function of the anode voltage, and means for applying simultaneous pulses to a given auxiliary column in each stage for lowering the change-over voltage of the associated crosspoints and to a given row of a given matrix of the first stage for controlling the change-over of a given crosspoint in every stage of matrices successively, thereby interconnecting two selected subscriber lines.

References Cited

UNITED STATES PATENTS

| | | | |
|---|---|---|---|
| 2,820,155 | 1/1958 | Linvill | 307—88.5 |
| 2,907,000 | 9/1959 | Lawrence | 340—173 |
| 3,048,821 | 8/1962 | Burstow et al. | 340—166 |
| 3,251,036 | 5/1966 | Smith | 340—166 |

JOHN W. CALDWELL, *Primary Examiner.*

D. J. YUSKO, *Assistant Examiner.*